United States Patent [19]

Berkelius

[11] 3,960,058
[45] June 1, 1976

[54] DEVICE AT HYDRAULIC MOTOR

[76] Inventor: Hans Berkelius, 36 Parkvagen, Taby, Sweden, S-18352

[22] Filed: Dec. 10, 1974

[21] Appl. No.: 531,401

[30] Foreign Application Priority Data
Dec. 12, 1973  Sweden .............................. 7316784

[52] U.S. Cl. ...................................... 91/224; 91/49; 91/50; 91/229
[51] Int. Cl.² ..................... F01L 15/12; F01L 21/04
[58] Field of Search ................. 91/229, 224, 49, 50, 91/401

[56] References Cited
UNITED STATES PATENTS

| | | | |
|---|---|---|---|
| 2,098,936 | 11/1937 | Armstrong et al. | 91/229 |
| 2,419,859 | 4/1947 | Tarr et al. | 91/229 |
| 2,649,078 | 8/1953 | Kelly | 91/229 |
| 2,799,226 | 7/1957 | Kangas | 91/229 |
| 3,279,326 | 10/1966 | Harvey et al. | 91/229 |

Primary Examiner—Paul E. Maslousky
Attorney, Agent, or Firm—Fred Philpitt

[57] ABSTRACT

This invention relates to a hydraulic motor device comprising a cylinder and a piston reciprocating therein said piston being moved in one direction by means of a spring and in the other direction by means of fluid under pressure supplied against one side of the piston, said cylinder including an inlet for fluid at one end and an outlet for fluid at the other end, and said piston including an overflow aperture from one working side to the other, which aperture is controlled by a stop valve that is either completely open or completely closed depending upon its impact against two spaced apart points on the cylinder end walls.

2 Claims, 6 Drawing Figures

DEVICE AT HYDRAULIC MOTOR

The hydraulic motor according to the idea of the invention is preferably, but not exclusively, intended for use in driving wiper blades and the like for cleaning glass surfaces, for example headlight glasses on vehicles. The working fluid preferably is a liquid, and a certain liquid excess can be used for flushing clean the glass surfaces simultaneously with their drying. The invention has as a special object to render it possible to work with a relatively high pressure of the fluid and to ensure that the working piston performs distinct reciprocatory movements. It was found that, for achieving the said object, conventional constructions are not satisfactory to effect the correct operation of the overflow stop valve disposed in the piston. By the present invention, said valve is given such a mode of operation that the hydraulic motor operates satisfactorily with pressures sufficiently high to be able to drive the wiper blades and to effect spraying onto the glass surfaces when the hydraulic motor is utilized in wiper blades for glass surfaces in vehicles. The invention is characterized in that the valve body is held resiliently in closed position and an open position by spring means, from which two positions the valve body is moved by said impacts.

Figure 1:
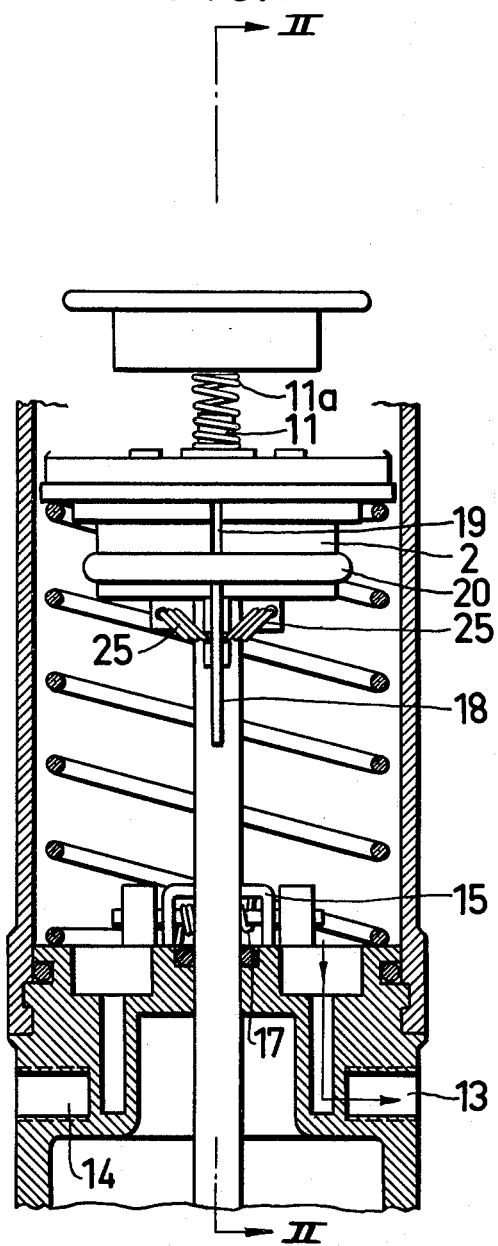
Figure 3:
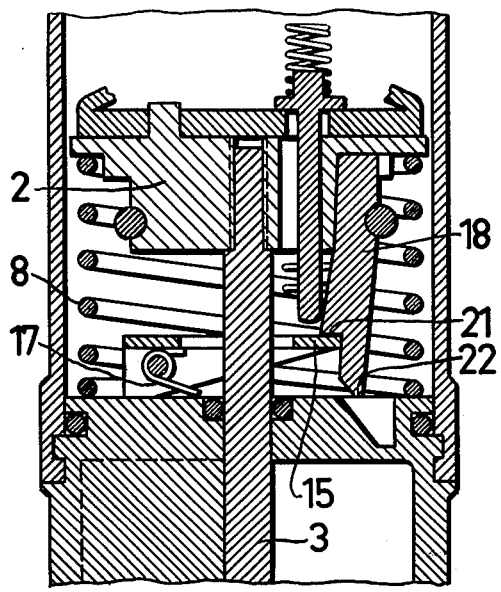
Figure 4:
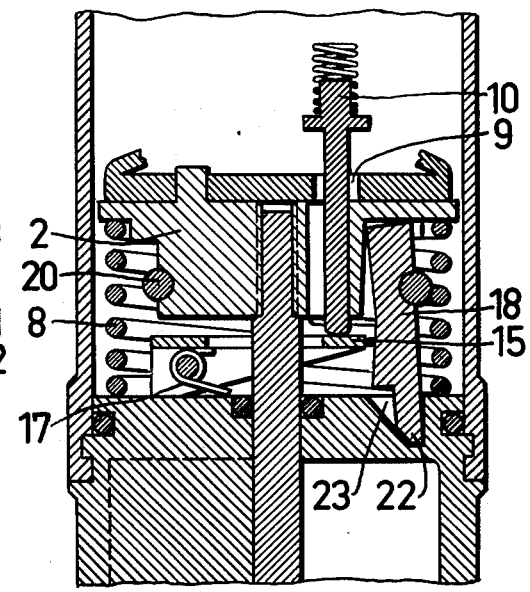
Figure 5:
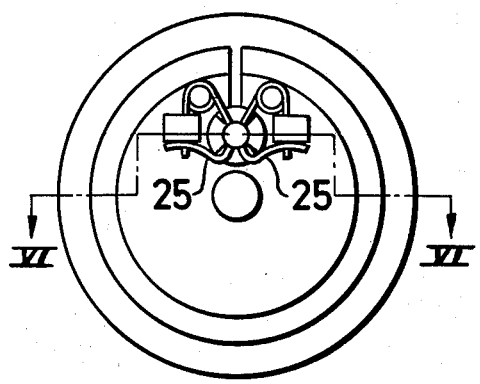
Figure 6:
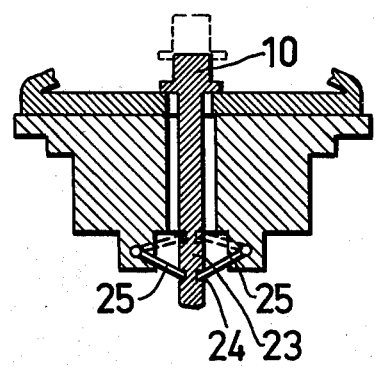

An embodiment of the invention is described in the following, with reference to the accompanying drawings, in which FIG. 1 is a portion of a longitudinal section through the invention, with the piston being in one of its outer positions and the drive spring being expanded at maximum, FIG. 2 also is a longitudinal section, with the piston, however, being in an intermediate position, FIG. 3 also is a longitudinal section of a portion of the hydraulic motor according to the invention, with the piston being near its other end position relative to the end position shown in FIG. 1, FIG. 4 is a section similar to that in FIG. 3, but with the piston being in said other end position, FIG. 5 is a plane view of a detail for controlling the valve position, and FIG. 6 is a longitudinal section through the valve and piston head and said detail for valve control.

Figure 2:
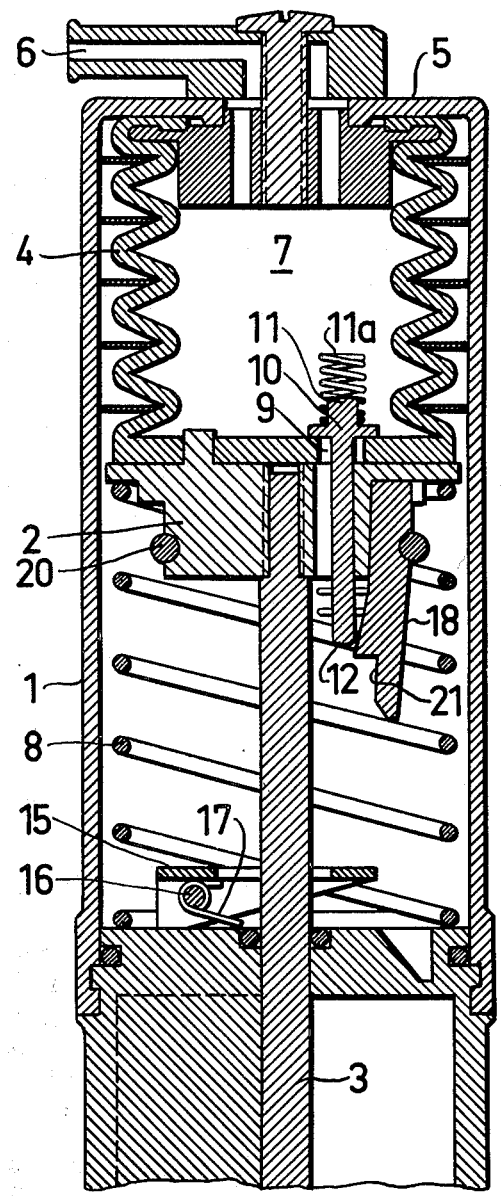

As appears most clearly from FIG. 2, the hydraulic motor comprises a cylinder 1, in which a piston 2 reciprocates and is controlled by a piston rod 3, from which the driving power of the hydraulic motor is taken. In the present embodiment, the piston 2 is combined with a bellows 4, thereby eliminating piston rings or other sealing means for the piston 2. The ends of the bellows are sealingly secured in the head 5 of the cylinder 1 and the head of the piston 2. Fluid under pressure is supplied in the inlet 6 from a fluid pressure source (not shown) and passed into the interior 7 of the bellows 4 through passageways. The piston 2 is moved by the pressure of the fluid downwards into the position shown in FIG. 2. On the other side of the piston 2 relative to the bellows 4, a compression spring 8 is provided which actuates the upward working stroke of the piston 2, i.e., compression of the bellows 4. In the piston 2 an overflow aperture 9 is opened and closed by means of a valve in the form of a stop valve, which comprises a valve body 10 sealing against a valve seat when the piston against the force of the spring 8 moves downwards. The valve body 10 is operated between open and closed positions by impacts against the upper end 11 and lower end 12 of the valve body when the piston 2 is in the respective outer positions. The upper end 11 of the valve body 10 is provided with a spring 11a, which thrusts again the cylinder head when the piston 2 is in its upper position and thereby pushes down the valve body 10 so that it sealingly abuts the sealing surface all about the overflow aperture 9.

When the valve body 10 has closed the aperture 9, and the piston 2 moves downwards against the pressure from the spring 8, the pressure fluid below the piston 2, i.e., in the space 13, flows out through an outlet aperture 14 in the lower end of the cylinder 1, see FIG. 1. The fluid from the aperture 13 is returned to a pump or the like (not shown), which produces the fluid pressure. Part of the fluid is used for flushing the glass surface, which is cleaned by a wiper means (not shown) driven by the piston rod 3. The fluid for flushing flows out through a second outlet aperture 14.

In order to bring about an impact and a striking power suitable for opening the valve body 10, a spring-loaded rocker arm 15 is provided pivotal about an axle 16 at the lower end of the cylinder 1 and can be pressed downwards against the action of a spring 17. A swing lever 18 is provided on the lower side of the piston 2 for swinging in the piston 2. The swing lever 18 is inserted in a groove 19, see FIG. 1 showing the device turned through 90° in relation to the illustration in FIG. 2, and is maintained therein by means of a spring ring 20. The swing lever 18, thus, can swing outwards to the right from the position shown in FIG. 2 against the action of the spring ring 20.

The swing lever 18 is formed at its lower end with a recess 21, which strikes against the rocker arm 15 when the piston 2 approaches its lower position, see FIG. 3. The rocker arm 15 is thereby pressed downwards against the action of spring 17, and upon continued downward movement of the piston 2 the point 22 of the swing lever 18 is moved into a recess 23 in the cylinder bottom. Said recess 23 is obliquely cut, so that the swing lever 18 is turned outwards to the position shown in FIG. 4. The recess 21 thereby is disengaged from the rocker arm 15, which springs upwards due to the force of the spring 17 and strikes against the lower end 12 of the valve body 10, so that the stop valve opens. See FIG. 4. The force in the spring 8 can now press the piston 2 upwards, because the fluid above the piston 2 can flow down through the aperture 9, thereby relieving the pressure on the upper side of the piston 2. In order additionally to ensure that the valve body 10 assumes two distinct positions, an open and a closed one, a special mechanism is provided, as shown in FIGS. 5 and 6. In FIG. 6 the valve body 10 is shown in closing position by fully drawn lines and in open position by dashed lines. The spindle 23 of the valve 10 is provided with a groove 24 extending all about, and in this groove two springs 25 abut. See FIG. 5. The springs are fastened in the lower side of the piston 2, see FIG. 1, and can thereby be turned from a position directed obliquely downwards, see FIGS. 1 and 6, to a position directed obliquely upwards, see the position indicated by dashed lines in FIG. 6. The springs 25, thus, act as rocker springs and bring about two distinct positions of the valve body 10, one opening and one closing position. The force of the springs 25 in the respective positions is surmounted at the impact of the valve body 10 against the upper end of the cylinder 1 in one position and against the rocker arm 15 when the piston 2 is in the lower end of the cylinder 2. By the arrangement of the rocker springs 25 distinct openings and closing positions for the valve body 10 are effected. Within the scope of the idea of the invention, other designs of the springs 25 than that shown can be used. In the drawings the springs are shown as helical springs with extended ends. As alternatives may be used cup springs or leaf springs. One can imagine also the embodiment of providing two grooves in the spindle of the valve body 10 and a spring engaging with one groove at a time, depending on the position of the valve body 10, but the engagement not being more powerful than that the impact of the valve body in the respective end position surmounts the power of engagement of the spring, said engagement power of the spring, however, being sufficient to prevent the valve body 10 from changing its position during the movement of the valve piston 2 from one end position to the other.

It is further to be noted that, as an advantageous embodiment, a piston 2 in combination with a bellows 4 has been illustrated, because hereby the sealing problem for the fluid is solved in a practical way, but also other forms of the piston 2 are applicable when working the invention.

What I claim:

1. A hydraulic motor device comprising in combination:
   a. a cylinder having an upper end and a lower end,
   b. a piston mounted for reciprocating movement away from and toward the upper end of said cylinder,
   c. a spring means positioned between the lower end of said cylinder and the piston and serving to bias said piston toward the upper end of said cylinder,
   d. a source of fluid pressure for moving said piston toward the lower end of said cylinder,
   e. a fluid inlet adjacent the upper end of said cylinder and a fluid outlet adjacent the lower end of said cylinder,
   f. an overflow aperture extending from one side of the piston to the other,
   g. a stop valve,
   h. resilient mounting means on said piston for mounting said stop valve with respect to said overflow aperture so that the stop valve can only alternate between a first completely closed position and a second completely open position,
   i. a swing lever projecting outwardly from said piston toward the lower end of the cylinder,
   j. a spring loaded rocker arm mounted adjacent the lower end of said cylinder,
   k. said swing lever being mounted so that as the piston moves downwardly toward the lower end of the cylinder the swing lever will first compress said spring loaded rocker arm and then release it,
   whereby when said spring loaded rocker arm is released it will impact against said stop valve and move it to the completely open position and said stop valve will not close until said spring means causes said stop valve to impact against the upper end of said piston.

2. A hydraulic motor device according to claim 1 wherein the resilient mounting means of (h) is a rocker spring mounted on said piston.

* * * * *